United States Patent
Molander et al.

(10) Patent No.: US 7,539,951 B1
(45) Date of Patent: May 26, 2009

(54) METHOD AND SYSTEM OF USING NAVIGATION AREA CONTROLS AND INDICATORS FOR NON-HIERARCHIES

(75) Inventors: Mark E. Molander, Cary, NC (US); Todd Michael Eischeid, Cary, NC (US); Kerry A. Ortega, Raleigh, NC (US); Thomas Brugler, Fuquay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/027,721

(22) Filed: Feb. 7, 2008

(51) Int. Cl.
 *G06F 3/048* (2006.01)
(52) U.S. Cl. ..................... 715/853; 715/854
(58) Field of Classification Search .......... 715/853, 715/854
 See application file for complete search history.

(56) References Cited

U.S. PATENT DOCUMENTS

| | | | |
|---|---|---|---|
| 4,864,497 A | 9/1989 | Lowry et al. | |
| 5,715,444 A | 2/1998 | Danish et al. | |
| 6,055,515 A * | 4/2000 | Consentino et al. | 705/27 |
| 6,636,250 B1 * | 10/2003 | Gasser | 715/853 |
| 7,290,222 B2 * | 10/2007 | Guido et al. | 715/853 |
| 7,313,761 B1 * | 12/2007 | Mcclellan | 715/713 |
| 2002/0052692 A1 | 5/2002 | Fahy | |
| 2004/0003013 A1 | 1/2004 | Coulthard et al. | |
| 2005/0132304 A1 * | 6/2005 | Guido et al. | 715/853 |
| 2006/0101424 A1 | 5/2006 | Griffith et al. | |
| 2007/0266321 A1 | 11/2007 | Bicker et al. | |
| 2008/0016474 A1 * | 1/2008 | Guido et al. | 715/854 |

* cited by examiner

*Primary Examiner*—Doug Hutton
*Assistant Examiner*—Henry Orr
(74) *Attorney, Agent, or Firm*—MaxValueIP, LLC

(57) ABSTRACT

One example of this invention is to provide indicators and quick access controls for the nodes in navigation tree that appear more than once in a hierarchy—where a pure hierarchical navigational tree falls short. Moreover, contextually and inline with the navigation tree, the user could quickly re-orient the tree to group all the repeating nodes together.

1 Claim, 6 Drawing Sheets

| | | |
|---|---|---|
| - Blade2 | | |
| + Alerts | | |
| + VMs | | |
| + # Storage | | |

| Name | Usage | Description |
|---|---|---|
| Vol A2 | 60% | Application volume |
| Vol B2 | 40% | Boot volume |
| Vol D-mail | 20% | Email data volume |

- Blade2

| | | Name | Usage | Description |
|---|---|---|---|---|
| + | Alerts | | | |
| + | VMs | | | |
| + # | Storage | Vol A2 | 60% | Application volume |
| | | Vol B2 | 40% | Boot volume |
| | | Vol D-mail | 20% | Email data volume |

FIG 2

| | Name | Mesh | Usage | Description |
|---|---|---|---|---|
| − Blade2 | | | | |
| + Alerts | | | | |
| + VMs | | | | |
| − # Storage | Vol A2 | | 60% | Application volume |
| | Vol B2 | | 40% | Boot volume |
| | Vol D-mail | Blade1 | 10% | Email data volume |
| | Vol D-mail | Blade2 | 20% | Email data volume |
| | Vol D-mail | Blade3 | 40% | Email data volume |

FIG 3

METHOD AND SYSTEM OF USING NAVIGATION AREA CONTROLS AND INDICATORS FOR NON-HIERARCHIES

BACKGROUND OF THE INVENTION

Navigation areas are extremely pervasive and popular UI structures today. They are usually presented in a major left-side area of a window, and as a pure hierarchy of selectable nodes. They typically have multiple roots as the highest-level folders, and branches for each root, down to "end leaves" or "end nodes". Clicking an end node in a navigation tree typically navigates a user or launches for him a related panel or view.

Most administrative UIs today pair a left-side navigation or launch tree area with a larger area. However, more and more UIs are starting to introduce topology UIs in the content area (e.g., VMWare® and IBM® Systems Director 6.1) which can be useful to show non-hierarchical meshes, relationships, and flows.

A shortcoming of navigation trees today is that they don't handle non hierarchies at all or not very well. Yet, there is an ever-increasing and growing "meshing" and interconnections today between things. A pure hierarchal constraint places an unnatural and unnecessary limitation on navigation trees.

The problem is that most admin users prefer to stay in and use simpler tabular UIs if they do not need the added meshing available in a content-side topology view, and they often do not need the topology view. So, surfacing indicators and controls for the meshed information in the navigation frame could benefit users by preemptively giving them control at a higher level.

SUMMARY OF THE INVENTION

Another problem with today's hierarchical navigational areas is that they place the burden of displaying of non-hierarchical UIs within the content area, which leads to other issues. For one, non-hierarchical relationship UIs ("topology UIs") are not very popular with users as a general purpose UI. One reason is because they are very difficult to scale to 100s or 1000s of items. And compared to tabular alternatives, they also can be more disorderly, take up a lot of screen space, and are harder to compare values among related items.

An embodiment of this invention provides indicators and quick access controls for the nodes in navigation tree that appear more than once in a hierarchy—where a pure hierarchical navigational tree falls short.

BRIEF DESCRIPTION OF THE DRAWINGS

FIG. 2 is a schematic diagram of a standard navigational tree
FIG. 3 is a schematic diagram of a wider mesh navigational tree

DETAILED DESCRIPTION OF THE PREFERRED EMBODIMENTS

Some embodiments of invention are used below for demonstration. First example:

In an embodiment, (FIG. 1), there are 2 nodes that have mesh buttons, "Storage" (120) and "Appls and OSs" (122). These 2 nav-tree nodes contain meshes-subnodes that also appear in other branches in the navigation tree. This type of mesh indication helps solve the problem for the user to know when nodes are part of an interrelated meshed area, and that additional views might be desirable. For example, if the user can preemptively see that a node contains a mesh before selecting it, the user could knowingly toggle the non-hierarchy of items on and off in the table, or even directly launch a traditional topology view in the content area. Most users generally prefer starting with simpler tabular UIs, yet sometimes the added connection information in a topology might be worth looking at.

Figure 1:
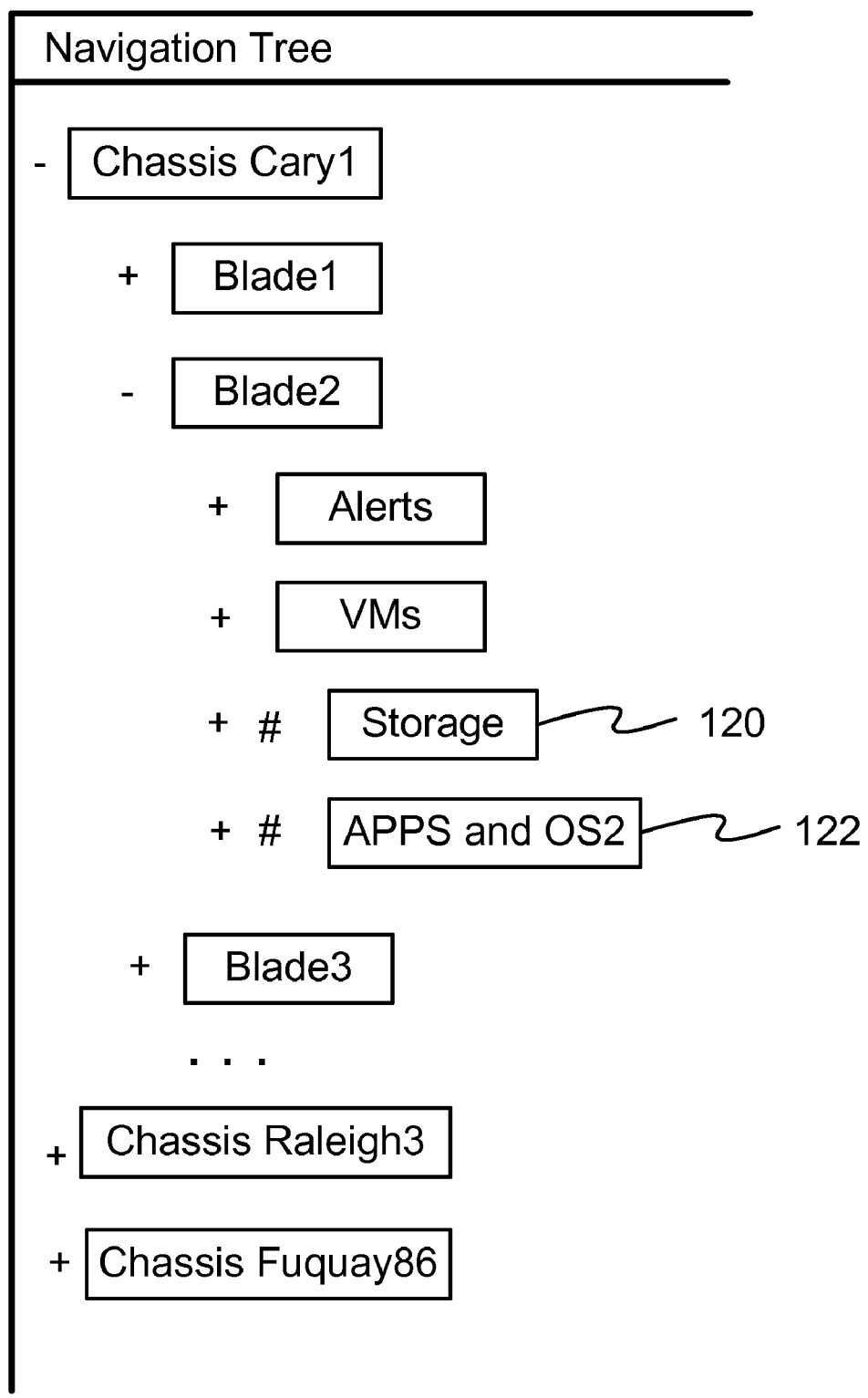
FIG. 1 is a schematic diagram of a mesh navigational tree

Next, if the user clicks on the "Storage" text in FIG. 1, it might launch a standard non-meshed tabular display in the content area, showing storage attributes for blade server ("Blade2"). This is shown in FIG. 2. Blade2's Storage folder directly contains its parts of 3 volumes as hierarchically shown in FIG. 2.

In one embodiment, if the user clicks on the mesh icon just to the left of the word "Storage" (or clicks "Storage" to toggle from hierarchy to mesh view, or some other similar highly surfaced way), he'd get a wider meshing of all the instances of storage within Blade2 as well as how the shared storage with Blade2 has relationships elsewhere. This is shown in FIG. 3. Vol D_mail is also shared with Blades 1 and 3, and those blades are using different percentages of that shared storage volume across blade servers. Note also that additional attributes, such as the "Mesh" column, could appear in the content area to add useful non-hierarchical information for the user.

Figure 4:
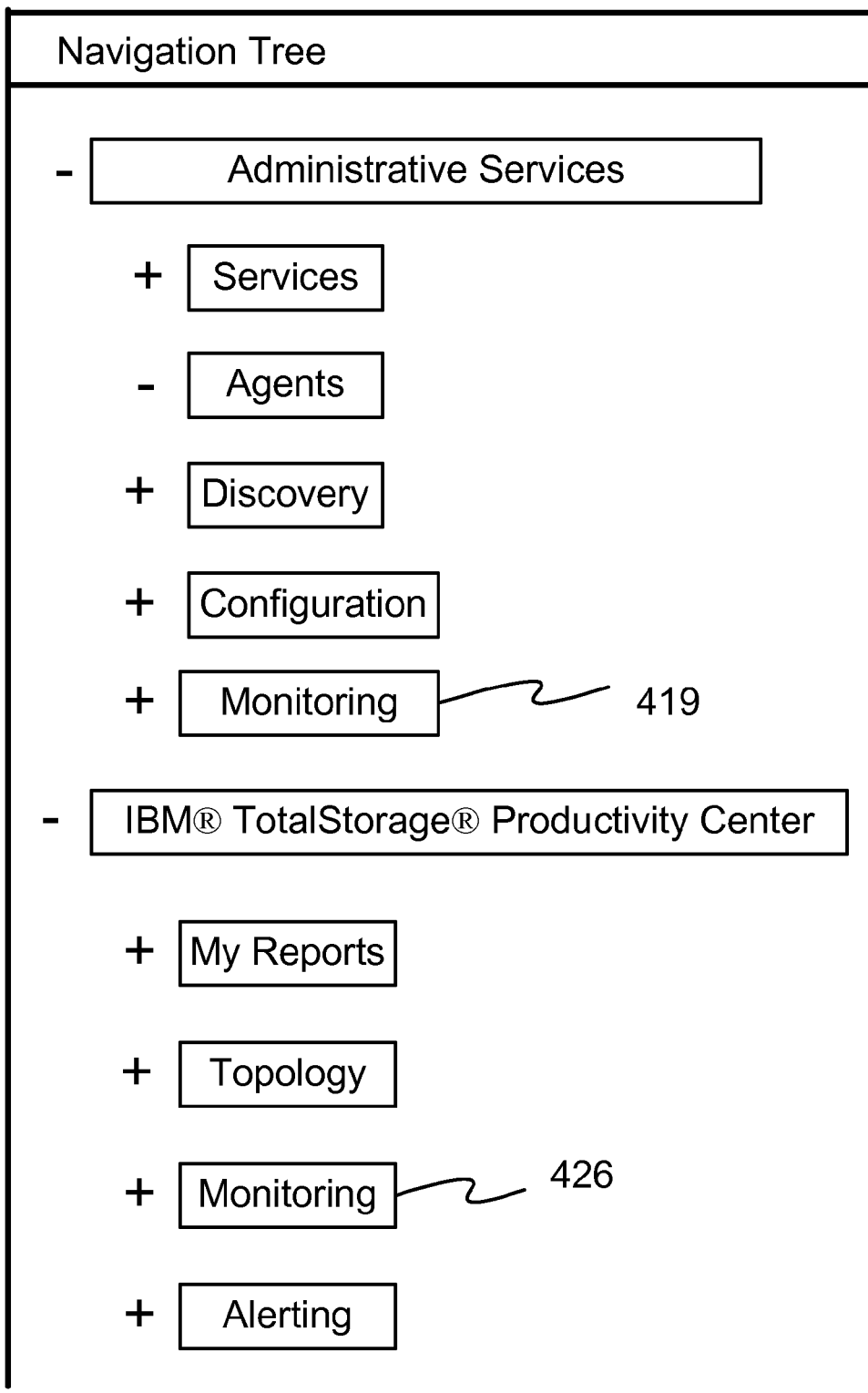
FIG. 4 is a schematic diagram of the navigational tree with repeating nodes
Figure 5:
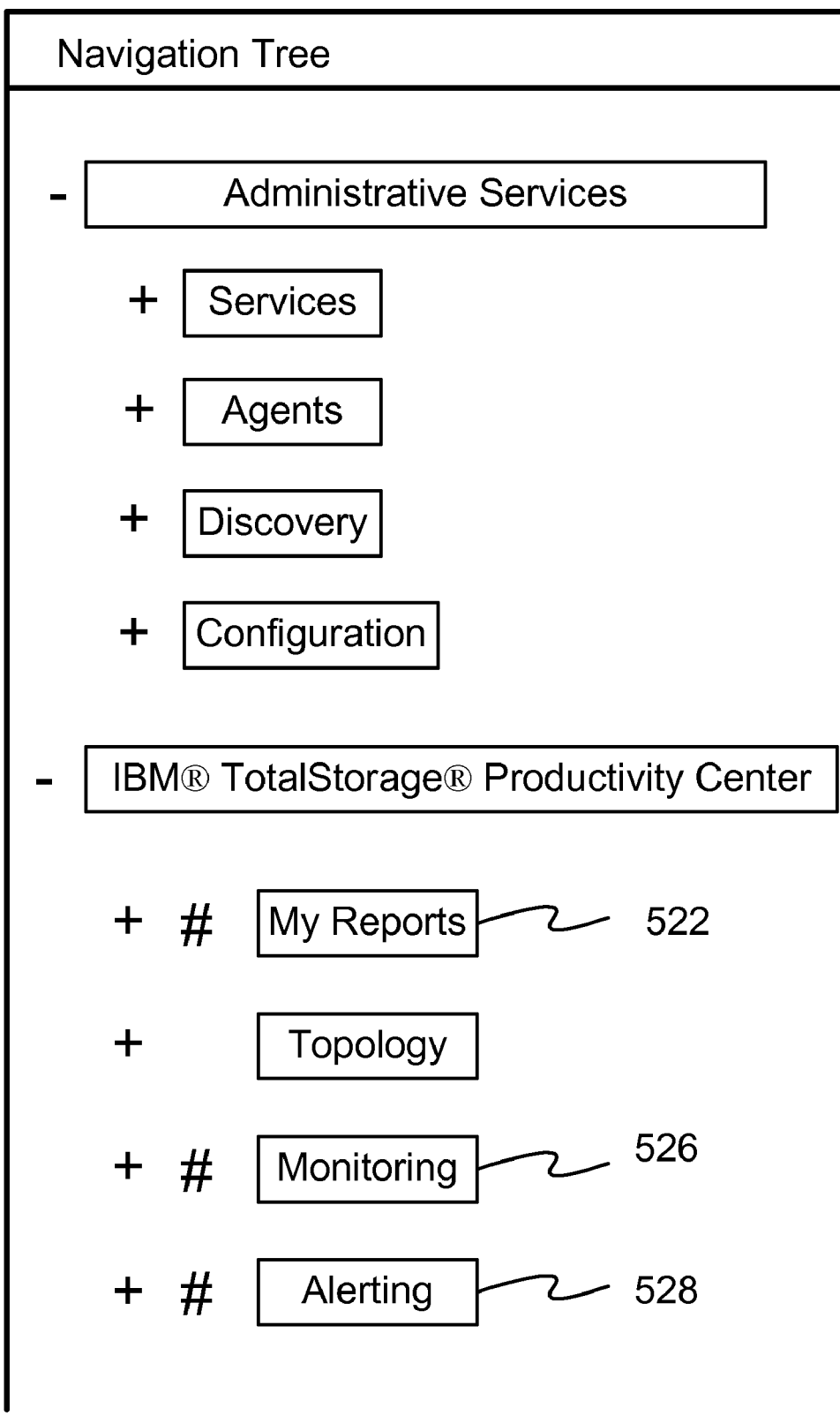
FIG. 5 is a schematic diagram of the navigational tree with repeating nodes and mesh indicators

The second example illustrates another embodiment of the invention. Note all the repeating of node names (419 and 426), which makes the navigation tree long and unwieldy (FIG. 4). FIG. 5 shows a navigation tree with meshing (mesh analogy) indicators/buttons adjacent to redundant tree nodes (522, 526, and 528)—nodes appearing more than once in the navigation tree. Note that these are container nodes in this example, but invention also works with end nodes.

Figure 6:
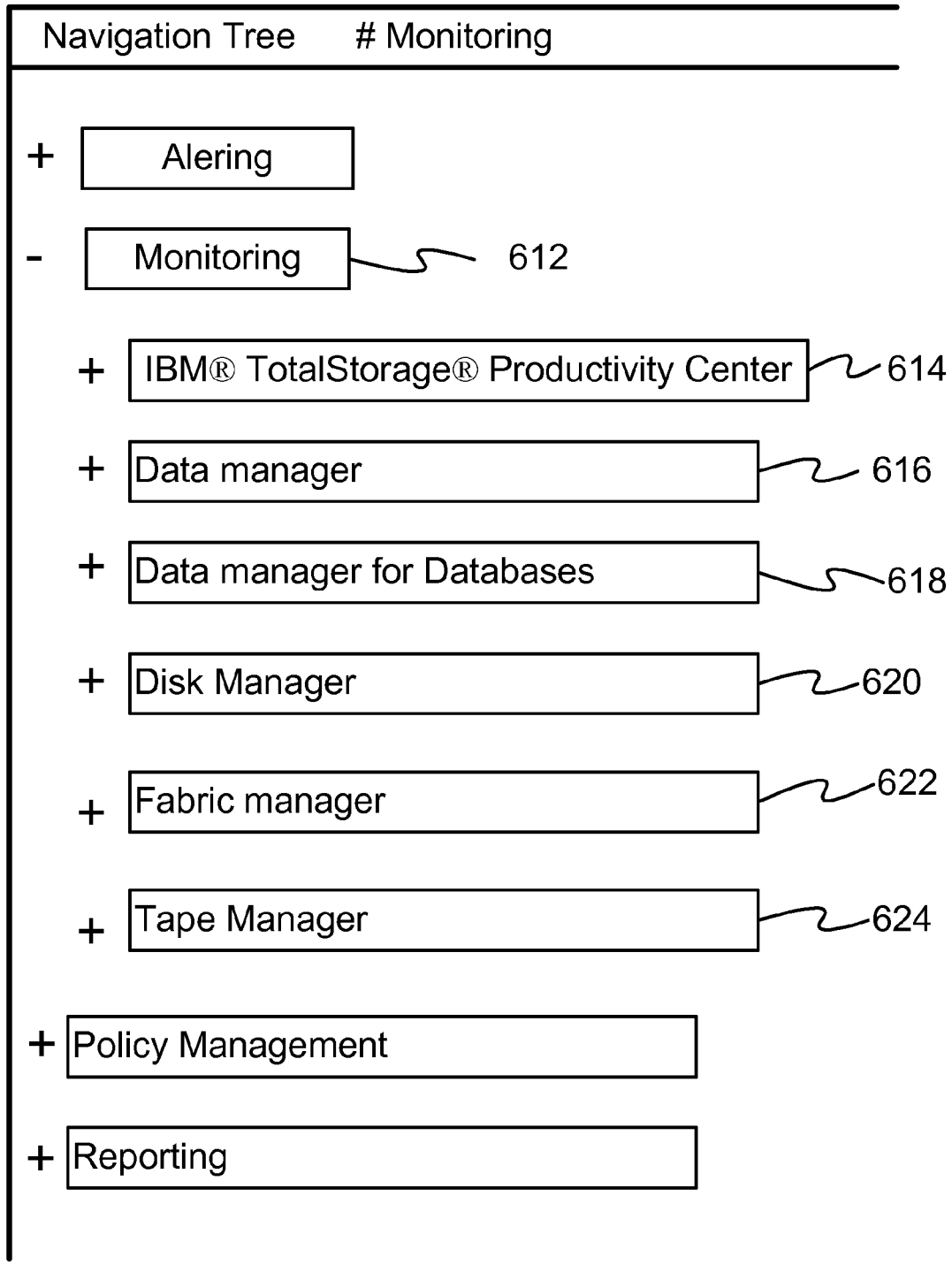
FIG. 6 is a schematic diagram of consolidation of the repeating nodes.

Therefore, in one embodiment, contextually and inline with the navigation tree, the user could quickly re-orient the tree to group all the repeating nodes together. One way to do this would be to re-root the tree based on the selection. So, if the user chooses the mesh button next to a "Monitoring" node in FIG. 5, in one embodiment, the tree filters and re-orients to look like the image in FIG. 6, with all the "Monitoring" (612) nodes grouped together (614, 616, 618, 620, 622, and 624).

An embodiment of the invention is a method of using navigation area controls and indicators for non-hierarchies for a user-interface structure, the method comprising:

- displaying a navigation area;
- displaying a content area;
- the navigation area displaying a hierarchical structure and a non-hierarchical mesh structure;
- the content area displaying detailed information about files or objects;
- the non-hierarchical mesh structure representing a topology of all possible relationships between the files or objects within the hierarchical structure;
- the non-hierarchical mesh structure providing indicators and quick-access controls for nodes on a navigation tree which represents all the files or objects which appear one or more times in the hierarchical structure;
- based on a user's input, switching between displaying the hierarchical structure and displaying the non-hierarchical mesh structure;

using an icon or a flag, indicating to the user whether the hierarchical structure or the non-hierarchical mesh structure is displayed; wherein the content area further comprising additional attributes, mesh column, and non-hierarchical information; wherein a two-dimensional or a three-dimensional graph representing the topology of all possible relationships between the files or objects within the hierarchical structure;

displaying and tagging all redundant nodes on the navigation tree;

displaying and tagging all container nodes on the navigation tree;

displaying and tagging all end nodes on the navigation tree;

toggling between an expanded view and a compressed view of the hierarchical structure and the non-hierarchical mesh structure;

contextually and inline with the navigation tree, the user re-orienting the navigation tree; and re-filtering to group all redundant nodes on the navigation tree.

A system, apparatus, or device comprising one of the following items is an example of the invention: navigation area controls and indicators, user-interface structure, navigation area, content area, mesh structure, information about files or objects, topology, non-hierarchical mesh structure, node, leaf node, container node, collapsible node, mesh column, redundant nodes, navigation tree, expanded view, compressed view, display device, or any software, applying the method mentioned above, for purpose of invitation or using navigation area controls and indicators for non-hierarchies for a user-interface structure.

Any variations of the above teaching are also intended to be covered by this patent application.

The invention claimed is:

1. A method of using navigation area controls and indicators for non-hierarchies for a user-interface structure, said method comprising:

displaying a navigation area;

displaying a content area;

said navigation area displaying an indicator of a non-hierarchical mesh structure;

said content area displaying detailed information about files or objects;

said non-hierarchical mesh structure representing a topology of all possible relationships between said files or objects within a hierarchical structure;

said non-hierarchical mesh structure providing indicators and quick-access controls for nodes on a navigation tree which represents all said files or objects which appear one or more times in said hierarchical structure;

based on a user's input, displaying both said hierarchical structure and displaying said non-hierarchical mesh structure displays all parent nodes corresponding to a given child node, under said given child node;

indicating to said user whether said hierarchical structure or said non-hierarchical mesh structure is displayed;

wherein said content area further comprising additional attributes, mesh column, and non-hierarchical information;

wherein a two-dimensional or a three-dimensional graph representing said topology of all possible relationships between said files or objects within said hierarchical structure;

displaying and tagging all redundant nodes on said navigation tree;

displaying and tagging all container nodes representing redundant tree nodes and appearing more than once in said navigation tree;

displaying and tagging all end nodes on said navigation tree;

toggling between an expanded view and a compressed view of said container nodes;

contextually and inline with said navigation tree, said user re-orienting said navigation tree, displaying said given child node on top of all said parent nodes corresponding to said given child node for a given container node.

\* \* \* \* \*